United States Patent [19]
Collings et al.

[11] Patent Number: 5,081,382
[45] Date of Patent: Jan. 14, 1992

[54] GENERATOR END TURN COOLING USING OIL FLOW CONTROL TUBES

[75] Inventors: Roger J. Collings; Clarence A. Grow, both of Rockford, Ill.

[73] Assignee: Sundstrand Corporation, Rockford, Ill.

[21] Appl. No.: 591,415

[22] Filed: Oct. 1, 1990

[51] Int. Cl.⁵ ...................... H02K 03/24; H02K 03/46
[52] U.S. Cl. ................... 310/54; 310/60 A; 310/260
[58] Field of Search .............. 310/45, 54, 58, 59, 310/60 A, 60 R, 91, 214, 215, 254, 260

[56] References Cited

U.S. PATENT DOCUMENTS

| | | | |
|---|---|---|---|
| 2,722,616 | 10/1955 | Moses | 310/54 |
| 2,727,161 | 12/1955 | Kilner et al. | 310/64 |
| 2,873,393 | 2/1959 | Baudry | 310/55 |
| 2,917,644 | 12/1959 | Laffoon et al. | 310/64 |
| 2,961,555 | 10/1960 | Towne | 310/43 |
| 3,497,737 | 2/1970 | Philofsky | 310/54 |
| 3,634,705 | 1/1972 | Fidel | 310/57 |
| 3,995,181 | 10/1976 | Suit | 310/58 |
| 4,117,358 | 9/1978 | Flick | 310/59 |
| 4,323,803 | 4/1982 | Danko et al. | 310/59 |
| 4,447,947 | 5/1984 | McCarty | 29/825 |

Primary Examiner—Steven L. Stephan
Assistant Examiner—Dennis R. Haszko
Attorney, Agent, or Firm—Wood, Phillips Mason, Recktenwall & Van Santen

[57] ABSTRACT

Lack of uniformity in liquid cooling the end turns of a dynamoelectric machine can be avoided in a structure including a stator (14) having a rotor receiving opening (22) and opposed end faces (18) and (20). Slots (24) in the stator (14) extend between the end faces (18) and (20) and a plurality of electrical conductors (28) are located in each of the slots (24) such that interstices exist between adjacent conductors (28) and define coolant flow passages within the slots (24) from one face (18) to the other (20). The conductors (18) exit the slots (24) at the end faces (18 and 20) and are redirected into another one of the slots (24) to thereby define end turns (30) at each end face (18 and 20). Two tubes (32 and 34) are located on each end turn (30) and adjacent ends (36, 38) of each tube (32, 34) are slightly spaced to defined a gap (40) and remote ends (42, 44) of each tube (32, 34) are sealed to the associated end face (18, 20) about the periphery of the associated slot (24).

5 Claims, 2 Drawing Sheets

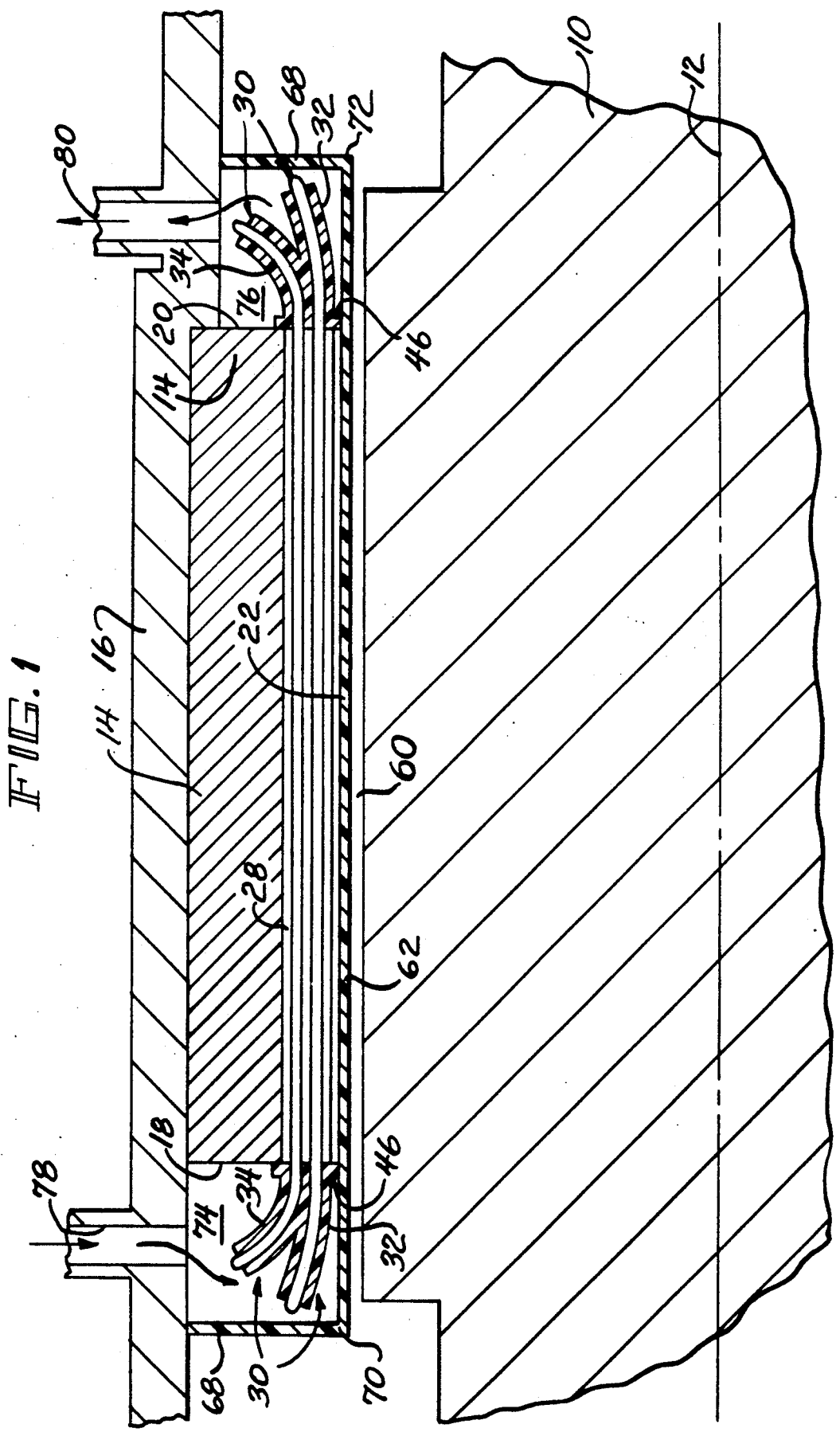

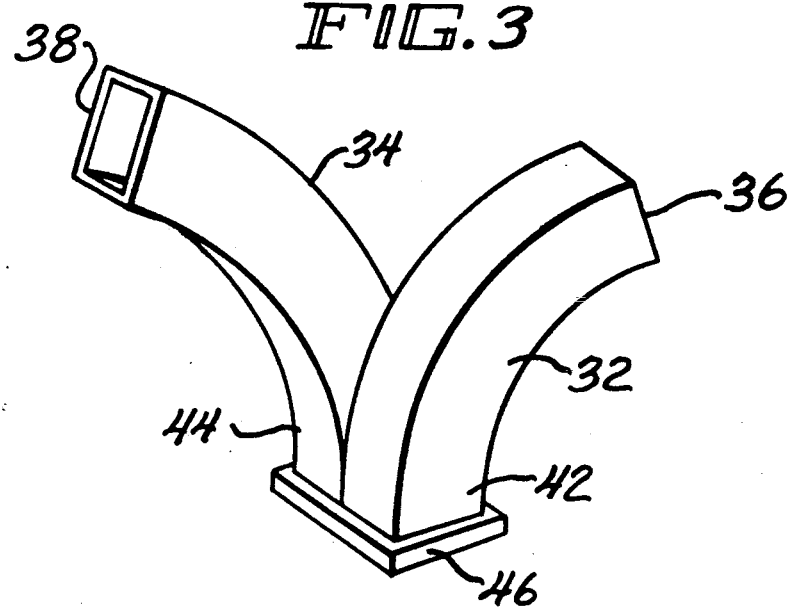
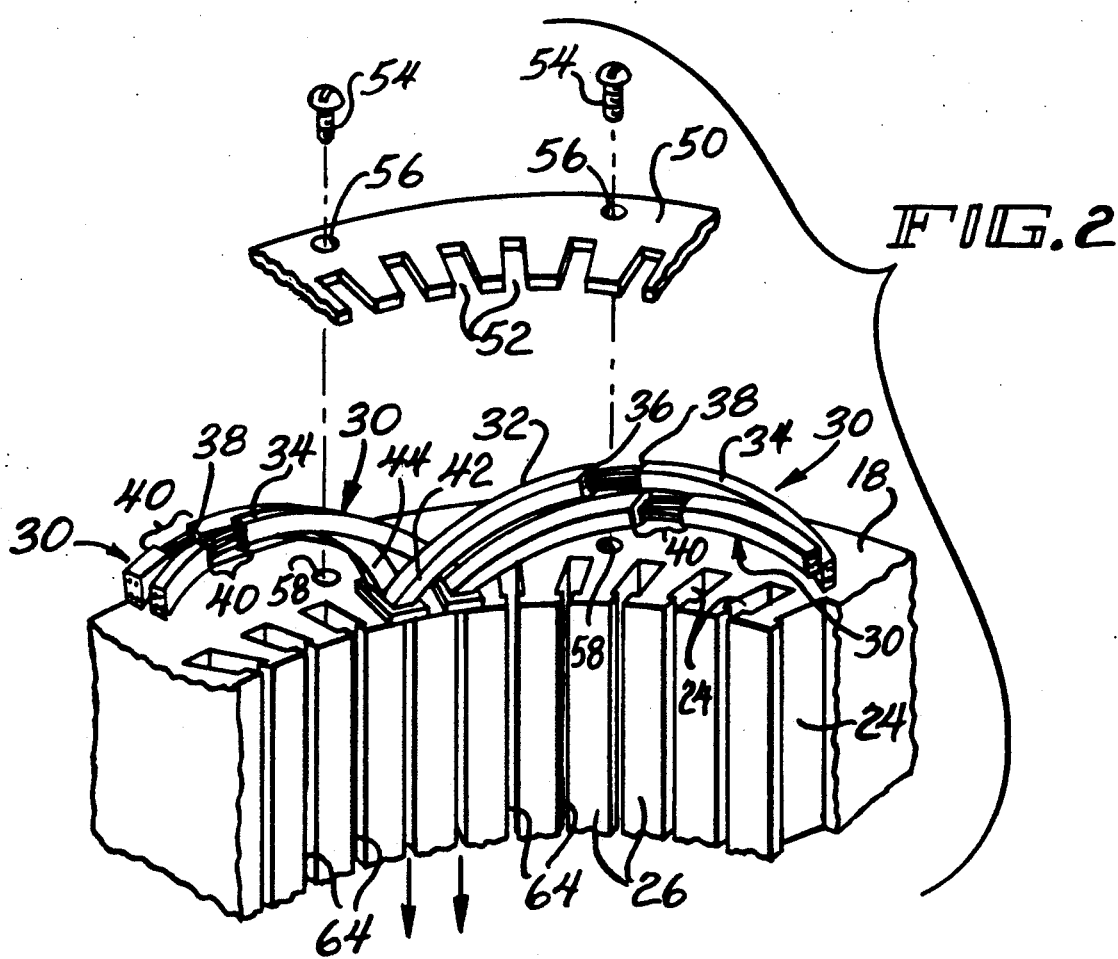

GENERATOR END TURN COOLING USING OIL FLOW CONTROL TUBES

FIELD OF THE INVENTION

This invention relates to dynamoelectric machines, such as generators or motors, and more particularly, to means for achieving improved cooling of the stator end turns in such machines.

BACKGROUND OF THE INVENTION

Dynamoelectric machines having high power densities almost universally utilize some means of liquid cooling of various conductors. In some cases, the conductors are hollow and a liquid coolant is flowed through the conductors for cooling purposes. This approach, while quite satisfactory, is generally limited to dynamoelectric machines which are physically large because of the inability to provide small hollow conductors through which a liquid coolant might flow without intolerable pressure drops.

Thus, in smaller dynamoelectric machines, conductors may be multi stranded, or they may have external shapes such that interstices exist between the strands of adjacent conductors which may be used to provide coolant flow passages. In the usual case, these conductors will be passed through the slot in, for example, a dynamoelectric machine stator and emerge from the ends thereof as end turns as is well known. Causing coolant flow through the slots of the stator to cool the conductor within the slot is readily accomplished and has been for many years. However, where the coolant emerges from the slots at the end faces of the stator, its velocity may be slowed so that even though it continues to contact the end turns, heat exchange drops and adequate cooling of the end turns cannot be easily accomplished.

Conventionally, to overcome this difficulty, the end turns of the stator may be sprayed with a coolant exiting nozzles located in the ends of a rotor. One difficulty with this approach is, however, the fact that some of the liquid coolant sprayed on the end turns tends to find its way into the air gap between the rotor and the stator causing so called "windage" losses which reduce the efficiency of the dynamoelectric machine.

The present invention is directed to overcoming one or more of the above problems and provides an improved, positive means for cooling the end turns of the stator of a dynamoelectric machine in such a way that the coolant will not enter the rotor-stator air gap.

SUMMARY OF THE INVENTION

It is the principal object of the invention to provide a new and improved dynamoelectric machine. More specifically, it is an object of the invention to provide such a machine with enhanced end turn cooling which prevents entry of the coolant into the machine air gap.

An exemplary embodiment of the invention achieves the foregoing object in a dynamoelectric machine including a stator having a rotor receiving opening and opposed end faces. Slots are located in the stator and extend between the end faces. A plurality of electrical conductors are located in each of the slots and disposed therein such that interstices exist between adjacent conductors and define coolant flow passages within the slots from one face to the other. The conductors exit the slots at the end faces and are redirected into another one of the slots thereby defining end turns at each face. Two tubes are disposed on each end turn and adjacent ends of each tube are at least slightly spaced while remote ends of each tube are sealed to the associated end face about the periphery of the associated slot.

In a preferred embodiment, the remote ends of the tube each include a sealing flange and there is further included a clamp secured to each end face and engaging the sealing flanges of remote tube ends at the corresponding face and clamping there against in sealing relation thereto.

In a highly preferred embodiment, each clamp has a plurality of slots for receipt of the tubes, the clamp slots being aligned with the slots in the stator so that the clamps additionally align the tube remote ends with the slots in the rotor.

In a preferred embodiment, each sealing flange mounts two of the tubes at the remote ends thereof. The tubes on each flange are oppositely being circumferentially directed and associated with different end turns.

A preferred embodiment includes a manifold on at least one of the end faces which contains the end turns thereat. A coolant port is provided for the manifold. Preferably, manifolds are located at both of the end faces and contain the associated end turns thereat. One of the manifolds is provided with a coolant inlet, and the other is provided with a coolant outlet.

In a preferred embodiment, the manifolds are defined by an elongated can located in the rotor receiving opening of the stator and sealing the slots between the end faces. The can preferably extends past the end faces in the axial direction.

The invention contemplates the provision of radially outward extending elements sealing engaging respective ends of the can axially outwardly of the end turns at the adjacent end face along with a housing surrounding the stator and having the inlet and outlet. The elements further sealingly engage the housing to complete definition of the manifolds.

In one embodiment of the invention, a rotor is journaled within the can for rotation about an axis.

Other objects and advantages will become apparent from the following specification taken in connection with the accompanying drawings.

DESCRIPTION OF THE DRAWINGS

FIG. 1 is a somewhat schematic, fragmentary sectional view of a machine made according to the invention;

FIG. 2 an exploded, fragmentary perspective view of one end of the stator;

FIG. 3 perspective view of a tube and flange assembly utilized in the invention.

DESCRIPTION OF THE PREFERRED EMBODIMENT

An exemplary embodiment of a dynamoelectric machine made according to the invention is illustrated in FIG. 1 and is seen to include a rotor 10 journaled by bearings (not shown) for rotation about an axis 12. The rotor 10 is surrounded by a stator 14 contained within a housing 16. The stator 14 includes opposed end faces 18 and 20 as well as a cylindrical, rotor receiving opening 22 concentric with the axis 12. As seen in FIGS. 1 and 2, a plurality of winding receiving slots 24 extend between the end faces 18 and 20 in adjacency with one another so as to form conventional, T-shaped stator poles 26.

A plurality of electrical conductors 28 extend through each of the slots 24. The conductors 28 may be multistranded conductors or conductors of nonrectangular cross section, such as round conductors. In the usual case, the conductor will be bundled into two main conductors. In any event, interstices exist between adjacent strands and/or adjacent conductors from one end face 18 to the other 20 to define a plurality of coolant flow paths in each of the slots 24.

At each of the end faces 18 and 20, the conductors 28 emerge to form conventional end turns, generally designated 30. As seen in FIG. 2 wherein four end turns are illustrated, each of the end turns 30 is surrounded by two end tubes 32 and 34. The end 36 of the tube 32 adjacent the end 38 of the tube 34 is slightly spaced from the latter to provide a gap 40 as illustrated by brackets in FIG. 2. The end 42 of the tube 32 remote from the end 36 is in turn sealed to the end face 18 or 20 about the slot 24 from which the associated end turn 30 emerges. Similarly, the end 44 of each tube 34 remote from the end 38 is likewise sealed to the end face 18 or 20 about the slot 24 from which the end turn 30 emerges.

Preferably, the tubes 32 and 34 are part of unitary structure such as is illustrated in FIG. 3. In this case, a mounting flange 46 is employed with the ends 42 and 44 of the tubes 32 and 34 integrally and sealingly engaged thereto such that the tubes 32 and 34 extend in opposite circumferential directions. Preferably, a temperature resistant, insulating material is utilized and the entire structure may be integrally molded as a single piece.

When the structure illustrated in FIG. 3 is utilized to provide the tubes 32 and 34, it will be appreciated that the tubes 32 and 34 of each such unitary structure receive different end turns 30.

To hold the unitary structure in place, a clamping plate 50 (FIG. 2) is employed. The plate 50 is circular in shape but preferably will be segmented, usually formed as three 120° segments.

The plate 50 includes a plurality of slots 52 which are sized to received the ends 42 and 44 of the tubes 32 and 34 of each unitary structure in overlying relation to the flange 46. The slots 52 are aligned with the slots 24 in the stator 14 so that the clamps serve to align the ends 42 and 44 with the slots 24 in the stator.

Threaded fasteners 54 may be passed through openings 56 in the segments defining the clamping plates 50 to be threaded into bores 58 within the end faces 18 or 20 to secure the plates 50 in place.

As is well known, the angular space 60 existing between the periphery of the rotor 10 and the rotor receiving opening 22 of the stator 14 is the air gap of the dynamoelectric machine. As alluded to previously, it is desirable to prevent cooling fluid from entering the air gap 60 or else machine efficiency will suffer.

According to the invention, a thin, cylindrical can 62 is disposed within the rotor receiving opening 22 in abutment with the stator 14. The can 62 thus serves to seal the radially inner openings 64 of the slots 24 which extend to the rotor receiving opening 22. In a preferred embodiment, the axial length of the can 62 is greater than the distance between the end faces 18 and 20 so as to extend past both as is illustrated in FIG. 1. A radially extending element which may be in the form of a ring-like plate 68 may be secured to the corresponding end 70 or 72 of the can 62 by any suitable means. The plates 68 also extend to the housing 16 to be sealed there against by any suitable means and in such a way as to encompass the end turns 30 at the associated end face 18 or 20. Thus, as viewed in FIG. 1, a manifold 74 exists adjacent the end face 18 while a manifold 76 exists adjacent the end face 20 with each manifold 74 or 76 surrounding the associated end turns 30.

The housing 16 includes a coolant inlet 78 to the manifold 74 as well as a coolant outlet 80 from the manifold 76. The spacing between the inlet 78 and the outlet 80 in the axial sense is greater than the axial spacing between the end faces 18 and 20 but less than the spacing between the plates 68.

In any event, a coolant such as oil may be introduced into the inlet 78 and from there flows into the manifold 74. The coolant may then enter the tubes 32 and 34 through their ends 36 and 38 respectively at the gaps 40 and flow through such tubes to the ends 42 and 44. At this point, the coolant will flow through the slots 24 and will be contained therein by the can 62. The flow will continue until the end face 20 is reached at which time, the coolant will enter appropriate ones of the tubes 32 and 34 through the ends 42 and 44. The flow will continue about conductors within the tubes 32 and 34 until an appropriate one of the gaps 40 within the manifold 76 is reached at which point the oil will emerge from the tubes 32 and 34 and flow into the manifold. The coolant may then be removed from the manifold by the outlet 80.

As can be appreciated, the use of the can 62 prevents the entry of coolant into the air gap 60. Nonetheless, excellent cooling of the end turns 30 is achieved. The tubes 32 and 34 act as continuations of the slots 24 over almost the entirety of the length of the end turns 30 to insure penetration of the coolant into the interstices between the strands or conductors of the end turns as well as to maintain a relatively high velocity of coolant flow to assure adequate cooling thereof.

I claim:

1. A dynamoelectric machine including:
   a stator having a rotor receiving opening and opposed end faces;
   slots in said stator extending between said faces;
   a plurality of electrical conductors in each of said slots and disposed therein such that interstices exist between adjacent conductors and define coolant flow paths within said slots from one end face to the other, said conductors exiting said slots at said end faces and being redirected into another one of the slots thereby defining end turns at each end face;
   two tubes on each end turn, adjacent ends of each tube being at least slightly spaced and remote ends of each tube being sealed to the associated end face about the periphery of the associated slot, said remote ends of said tubes each including a sealing flange; and
   a clamp secured to each said end face and engaging the sealing flanges of remote tube ends at the corresponding face and clamping them thereagainst in sealing relation thereto.

2. The dynamoelectric machine of claim 1 wherein each clamp has a plurality of slots for receipt of said tubes, said clamp slots being aligned with said slots in said stator so that said clamps additionally align said tube remote ends with said slots in said stator.

3. The dynamoelectric machine of claim 1 wherein each sealing flange mounts two of said tubes at the remote ends thereof, the tubes on each flange being oppositely circumferentially directed and associated with different end turns.

4. A dynamoelectric machine including:
a stator having a rotor receiving opening and opposed end faces;
slots in said stator extending between said faces;
a plurality of electrical conductors at each of said slots and disposed therein such that interstices exist between adjacent conductors and define coolant flow paths within said slots from one end face to the other, said conductors exiting said slots at said end faces and being redirected into another one of the slots thereby defining end turns at each end face; and
two tubes on each end turn, adjacent ends of each tube being at least slightly spaced and remote ends of each tube being sealed to the associated end face about the periphery of the associated slot, said remote ends of adjacent tubes on adjacent end turns being mounted on a common base with said adjacent tubes on adjacent end turns being oppositely circumferentially directed.

5. The dynamoelectric machine of claim 4 wherein said common base comprises a sealing flange sealed to the associated end face about the periphery of the two associated slots.

* * * * *